United States Patent [19]

Hattori et al.

[11] Patent Number: 5,089,444
[45] Date of Patent: Feb. 18, 1992

[54] METHOD OF PRODUCING COLORED CRYSTALLIZED GLASS

[75] Inventors: Masateru Hattori; Takashi Okamura; Kazuo Kondo, all of Aichi, Japan

[73] Assignee: NGK Spark Plug Co., Ltd., Aichi, Japan

[21] Appl. No.: 593,530

[22] Filed: Oct. 5, 1990

Related U.S. Application Data

[63] Continuation-in-part of Ser. No. 359,295, May 31, 1989, abandoned.

Foreign Application Priority Data

May 31, 1988 [JP] Japan .................. 63-133859

[51] Int. Cl.$^5$ .................. C03C 10/04; C03C 10/08
[52] U.S. Cl. .................. 501/9; 501/17; 501/69; 501/71
[58] Field of Search .................. 501/69, 17, 2, 7, 5, 501/6, 8, 9, 71

[56] References Cited

U.S. PATENT DOCUMENTS 4,084,974  4/1978  Beall et al. .................. 501/4
4,192,688  3/1980  Babcock et al. .................. 501/7

FOREIGN PATENT DOCUMENTS 60-176966  9/1985  Japan .
61-111955  5/1986  Japan .

*Primary Examiner*—Karl Group
*Attorney, Agent, or Firm*—Sughrue, Mion, Zinn, Macpeak & Seas

[57] ABSTRACT

A method of preparing colored crystallized glass is disclosed, comprising the steps of:

(a) adding to a crystallized glass material from 0.1 to 10 parts by weight of a coloring agent per 100 parts by weight of the crystallized glass material, said coloring agent having been prepared by preliminarily burning in an oxidizing atmosphere at a temperature of from 1,000° to 1,400° C. for at least 1 hour from 0.05 to 7 parts by weight of $Fe_2O_3$, from 0.03 to 5 parts by weight of CoO, and at least one oxide selected from the group consisting of from 0.01 to 2.5 parts by weight of NiO and from 0.01 to 2.5 parts by weight of $Cr_2O_3$, the amounts of the components of the coloring agent being given in parts by weight per 100 parts by weight of the crystallized glass material;

(b) molding the resulting mixture under a pressure of from 500 to 3,000 kg/cm$^2$; and (c) calcining the molded mixture to effect crystallization heat treatment.

11 Claims, No Drawings

METHOD OF PRODUCING COLORED CRYSTALLIZED GLASS

This is a continuation-in-part application of application Ser. No. 07/359,295 filed May 31, 1989, now abandoned.

FIELD OF THE INVENTION

The present invention relates to a method of coloring glass ceramics, particularly crystallized glass.

BACKGROUND OF THE INVENTION

Heretofore, alumina has been mainly used as an electrically insulating ceramic material. Alumina, however, has various disadvantages. For example, alumina causes a delay in signal propagation because it has a high dielectric constant. The calcination temperature of alumina is so high that tungsten or molybdenum having a high melting point must necessarily be used as a signal conductor, even though the conductivity of tungsten or molybdenum is relatively poor. Moreover, since the coefficient of thermal expansion of ceramic is greater than that of a silicon device chip, stress and/or strain is produced in the combination thereof.

In order to overcome the above problems, the present inventors have developed a crystallized glass as disclosed in JP-A-59-92943, JP-A-59-83957, JP-B-63-6503, JP-B-63-6499 and U.S. Pat. No. 4,540,671. (The term "JP-A" as used herein means an "unexamined published Japanese patent application", and the term "JP-B" as used herein means an "examined Japanese patent publication".) The calcination temperature of the above crystallized glass is sufficiently low such that high density wiring of highly electrically conductive metals such as gold, silver or copper is practical and simultaneous calcination can be carried out. Depending on the density, speed and size of the semiconductor elements, low temperature calcination can be carried out with a crystallized glass having a low dielectric constant and a low coefficient of thermal expansion.

However the above crystallized glass ceramic is white in color and requires compounding with a coloring agent in order to protect an encased integrated circuit element from light.

If, however, an oxide coloring agent commonly used for the coloration of alumina is mixed with the above crystallized glass material and calcined, harmful components, such as cristobalite, are formed which raise the coefficient of thermal expansion of the crystallized glass produced during calcination (crystallization thermal treatment), and colored crystallized glass having the desired physical characteristics cannot be obtained.

SUMMARY OF THE INVENTION

An object of the present invention is to provide a colored crystallized glass having excellent properties of bending strength and coefficient of thermal expansion.

Another object of the present invention is to provide a method of producing such a colored crystallized glass.

Other objects and effects of the present invention will be apparent from the following description.

The above objects of the present invention are attained by a method of producing colored crystallized glass comprising the steps of:

(a) adding to a crystallized glass material from 0.1 to 10 parts by weight of a coloring agent per 100 parts by weight of the crystallized glass material, said coloring agent having been prepared by preliminarily burning in an oxidizing atmosphere at a temperature of from 1000° to 1400° C. at least 1 hour from 0.05 to 7 parts by weight of $Fe_2O_3$, from 0.03 to 5 parts by weight of CoO, and at least one oxide selected from the group consisting of from 70.01 to 2.5 parts by weight of NiO and from 0.01 to 2.8 parts by weight of $Cr_2O_3$, the amounts of the components of the coloring agent being given in parts by weight per 100 parts by weight of the crystallized glass material;

(b) molding the resulting mixture under a pressure of from 500 to 3,000 kg/cm$^2$; and (c) calcining the molded mixture to effect crystallization heat treatment.

DETAILED DESCRIPTION OF THE INVENTION

The coloring agent of the present invention is black in color. When it is compounded with white crystallized glass, crystallized glass which is from dark gray to black in color is obtained.

This colored crystallized glass is reduced in the deterioration of bending strength as compared with non-colored crystallized glass. The above coloring agent has good compatibility with the crystallized glass material as the main component, is stable within the calcination temperature range, is finely and uniformly dispersed in the crystallized glass, and thus does not impair the characteristics of the resulting crystallized glass.

The amount of the coloring agent is from 0.1 to 10 parts by weight, preferably from 0.5 to 7.0 parts by weight, and more preferably from 1 to 5.0 parts by weight, per 100 parts by weight of the crystallized glass material. If the amount of the coloring agent added is less than 0.1 part by weight per 100 parts by weight of the crystallized glass material, the coloring effect is poor. On the other hand, if it is more than 10 parts by weight per 100 parts by weight of the crystallized glass material, the strength and electrical characteristics of the sintered body are impaired.

The coloring agent is prepared by preliminary burning $Fe_2O_3$, CoO, and at least one oxide selected from NiO and $Cr_2O_3$.

The amount of $Fe_2O_3$ is from 0.05 to 7 parts by weight, preferably from 0.1 to 5 parts by weight, and more preferably from 0.3 to 3 parts by weight. If the amount of $Fe_2O_3$ is less than 0.05 part by weight, the coloring effect is poor; and if it is more than 7 parts by weight, a dense sintered body cannot be obtained.

The amount of CoO is from 0.03 to 5 parts by weight, preferably from 0.1 to 4 parts by weight, and more preferably from 0.1 to 2.5 parts by weight. If the amount of CoO is less than 0.03 part by weight, the coloring effect is poor; and if it is more than 5 parts by weight, the strength of the sintered body is markedly reduced.

The amount of NiO is from 0.01 to 2.5 parts by weight, and preferably from 0.1 to 2.5 parts by weight. If the amount of NiO is less than 0.01 part by weight, the coloring effect is poor; and if it is more than 2.5 parts by weight, the strength of the sintered body is decreased.

The amount of $Cr_2O_3$ is from 0.01 to 2.8 parts by weight, and preferably from 0.1 to 2.5 parts by weight. If the amount of $Cr_2O_3$ is less than 0.01 part by weight, the coloring effect is poor; and if it is more than 2.8 parts by weight, the strength of the sintered body is decreased. The amounts of the components of the coloring agent are given in parts by weight per 100 parts by weight of the crystallized glass material.

The preliminary burning is carried out in an oxidizing atmosphere at a temperature of from 1,000° to 1,400° C., preferably from 1,000° to 1,400° C., and more preferably from 1,000° to 1,300° C. for at least 1 hour and preferably from 1 to 5 hours. In general, a lower preliminary burning temperature requires a longer preliminary burning time, and a higher preliminary burning temperature only requires a shorter preliminary burning time. The conditions for preliminarily burning may be in the air at atmospheric pressure. Conditions in which the oxides (coloring agents) are reduced are not suitable for the present invention. In the preliminarily burning, a muffle furnace is preferably used to prevent scattering of the coloring agent.

As the crystallized glass material, there is no particular limitation and any of them available in the art may be used in the present invention. That is, (1) crystallized glass which reacts with a conventional metallic oxide coloring agent without preliminarily burning and (2) crystallized glass which loses its function due to the generation of cristobalite, etc. when a conventional metallic oxide coloring agent without preliminarily burning is added can be used in the present invention.

The coloring agent is mixed with the crystallized glass material, molded under pressure and then calcined to effect crystallization heat treatment to obtain the colored crystallized glass of the present invention. Additionally, conventional additives, such as an auxiliary molding agent, can be added to the mixture of the coloring agent and the crystallized glass material.

The pressure under which the mixture is molded is preferably from 500 to 3,000 kg/cm² and more preferably from 800 to 2,000 kg/cm².

The calcination of the mixture may be carried out in the air at atmospheric pressure. The conditions and the furnace used for calcining are not limited and conventional ones may be used in the present invention.

Particularly, the calcining step is conducted at a temperature of from 800° to 1200° C. and preferably from 900° to 1100° C. for a time (i.e., retention time at maximum temperature) of from 0.5 to 5 hours and preferably from 1 to 3 hours. The calcining step may also be carried out in an inert atmosphere such as a $N_2$ atmosphere.

The calcining step is generally conducted at atmospheric pressure but is not particularly limited in this regard, and may be carried out under reduced pressure or increased pressure.

In accordance with the present invention, a crystallized glass sintered body having a low dielectric constant, a low water absorption, a high bending strength and a high coefficient of thermal expansion similar to that of non-colored crystallized glass and further colored black, is readily produced.

The present invention is described in greater detail with reference to the following examples, but the present invention is not construed as being limited thereto.

EXAMPLE

A glass frit comprising 57.5 wt % of $SiO_2$, 25.5 wt % of $Al_2O_3$ and 12 wt % of MgO with 2.5 wt % of ZnO, 2.0 wt % of $B_2O_3$ and 0.5 wt % of $P_2O_5$ added thereto was used as a starting material. Any one of reagent grade $Fe_2O_3$, CoO, NiO and $Cr_2O_3$ was compounded in the proportions shown in Table 1, and the resulting mixture was burned at 1,200° C. for 2 hours to obtain a black product as the coloring agent. This black product in the amount of 3 to 7 parts by weight was added to 100 parts of the glass frit.

The glass frit and the coloring agent were mixed for 12 hours in an alumina pot. The slurry thus obtained was dried at 150° C. for 4 hours in an electric drier, and then 4 parts by weight of an auxiliary molding agent (acrylic resins) was added and then dried. The resulting powder was passed through a 80 mesh screen. The powder thus obtained was molded at a pressure of 800 kg/cm² and calcined for 30 minutes at the temperature shown in Table 1.

For comparison, sintered bodies which did not contain a pigment and other sintered bodies wherein the coloring agent (mixture of oxides) was not subjected to preliminary burning before being added to the glass frit were produced.

All the procedures for preparing the sintered bodies were carried out in the air at atmospheric pressure.

These sintered bodies were measured for various physical properties, the results of which are shown in Table 1. All proportions are given in terms of parts by weight.

TABLE 1

| Sample No. | Compounding Proportion | | | | | | Burning Temperature (°C.) | Calcination Temperature (°C.) |
|---|---|---|---|---|---|---|---|---|
| | Glass Frit (part) | Coloring Agent | | | | | | |
| | | $Fe_2O_3$ (part) | CoO (part) | NiO (part) | $Cr_2O_3$ (part) | | | |
| 1 | 100 | — | — | — | — | | — | 930 |
| 2 | 100 | — | — | — | — | | — | 970 |
| 3 | 100 | 1.0 | 0.5 | 1.0 | 0.5 | | 1,200 | 930 |
| 4 | 100 | 1.0 | 0.5 | 1.0 | 0.5 | | 1,200 | 970 |
| 5 | 100 | 1.0 | 0.5 | 1.0 | 0.5 | | Not burned | 930 |
| 6 | 100 | 1.0 | 0.5 | 1.0 | 0.5 | | Not burned | 970 |
| 7 | 100 | 1.7 | 0.8 | 2.5 | — | | 1,200 | 930 |
| 8 | 100 | 2.7 | 1.4 | — | 2.7 | | 1,200 | 930 |

| Sample No. | Properties of Sintered Body | | | | | |
|---|---|---|---|---|---|---|
| | Bending Strength (kg/cm²) | Coefficient of Thermal Expansion (30–400° C.) ($\times 10^{-4}$) | Dielectric Constant (10 MHz) | tan δ ($\times 10^{-4}$) 10 to 100 MHz | Appearance | Note |
| 1 | 2,005 | 24.1 | 5.2 | less than 10 | white | Control |
| 2 | 2,015 | 34.2 | 5.2 | less than 10 | white | Control |
| 3 | 1,911 | 26.1 | 5.2 | less than 10 | black gray | Invention |
| 4 | 1,954 | 38.2 | 5.2 | less than 10 | black gray | Invention |
| 5 | 1,240 | 32.0 | — | — | deep green | Comparison |
| 6 | 1,490 | 35.0 | — | — | deep green | Comparison |

TABLE 1-continued

| 7 | 1,885 | 26.3 | 5.3 | less than 10 | black | Invention |
| 8 | 1,827 | 20.6 | 5.5 | less than 10 | black | Invention |

The bending strength was measured according to JIS R1601. The coefficient of thermal expansion was measured according to JIS C2141. The dielectric constant and the tan δ were measured by the dielectric rod resonator method.

Samples Nos. 3, 4 and 7, 8 according to the present invention had a bending strength and a coefficient of thermal expansion nearly equal to those of Nos. 1, 2 of crystallized glass with no coloring agent added thereto. In Sample Nos. 5 and 6 in which the burning of the coloring agent was not carried out, the bending strength was markedly poor even though the total amount of the added oxides was equal. Particularly, in Sample No. 6, the thermal expansion curve greatly bent at 190° to 200° C. due to the precipitation of cristobalite.

In so-called low temperature fired materials (glass composite materials and non-glass material) as well as the crystallized glass of the present invention for use as the mother material, equivalent, results are obtained. Thus the coloring agent of the present invention can be incorporated in such mother materials.

As a second example, a mixture of 1.0 part by weight of $Fe_2O_3$, 0.5 part by weight of CoO, 1.0 part by weight of NiO and 0.5 part by weight of $Cr_2O_3$ was subjected to preliminary burning at 1200° C. in an atmosphere of 40 vol% $O_2$ and 60 vol% $N_2$, and then mixed with 100 parts by weight of glass frit, followed by calcining at 97° C. in air in the same manner. The product had a bending strength of 1,950 $kg/cm^2$, a coefficient of thermal expansion of 38.0, a dielectric constant of 5.2 and a tan δ (10–100 MHz) of less than $10 \times 10^{-4}$. The product was black gray in color, and its main crystal constituent was codierite.

While the invention has been described in detail and with reference to specific examples thereof, it will be apparent to one skilled in the art that various changes and modifications can be made therein without departing from the spirit and scope thereof.

What is claimed is:

1. Colored crystallized glass prepared by:
   (a) adding to a crystallized glass material from 0.1 to 10 parts by weight of a coloring agent per 100 parts by weight of the crystallized glass material, said coloring agent having been prepared by preliminary burning in an oxidizing atmosphere at a temperature of from 1,000° to 1,400° C. for at least 1 hour from 0.05 to 7 parts by weight of $Fe_2O_3$, from 0.03 to 5 parts by weight of CoO, and at least one oxide selected from the group consisting of from 0.01 to 2.5 parts by weight of NiO and from 0.01 to 2.8 parts by weight of $Cr_2O_3$, the amounts of the components of the coloring agent being given in parts by weight per 100 parts by weight of the crystallized glass material;
   (b) molding the resulting mixture under a pressure of from 500 to 3,000 $kg/cm^2$; and
   (c) calcining the molded mixture to effect crystallization heat treatment.

2. Colored crystallized glass as in claim 1, said coloring agent having been prepared by preliminary burning $Fe_2O_3$, CoO and NiO.

3. Colored crystallized glass as in claim 1, said coloring agent having been prepared by preliminarily burning $Fe_2O_3$, CoO and $Cr_2O_3$.

4. Colored crystallized glass as in claim 1, said coloring agent having been prepared by preliminarily burning $Fe_2O_3$, CoO, NiO and $Cr_2O_3$.

5. Colored crystallized glass as in claim 1, said coloring agent is added to the crystallized glass material in an amount of from 0.5 to 7.0 parts by weight per 100 parts by weight of the crystallized glass material.

6. Colored crystallized glass as in claim 1, said coloring agent is added to the crystallized glass material in an amount of from 1 to 5.0 parts by weight per 100 parts by weight of the crystallized glass material.

7. Colored crystallized glass as in claim 1, said coloring agent having been prepared by preliminary burning at a temperature of from 1,100 to 1,400° C.

8. Colored crystallized glass as in claim 1, said coloring agent having been prepared by preliminary burning at a temperature of from 1,100 to 1,300° C.

9. Colored crystallized glass as in claim 1, said coloring agent having been prepared by preliminary burning for a period of from 1 to 5 hours.

10. Colored crystallized glass as in claim 1, said molding is carried out at a pressure of from 800 to 2,000 $kg/cm^2$.

11. Colored crystallized glass as in claim 1, wherein said calcining is carried out a temperature of from 800 to 1200° C. for a period of from 0.5 to 5 hours.

* * * * *